ELECTRICAL SWITCHING DEVICE

Filed Jan. 9, 1964

FIG. 1

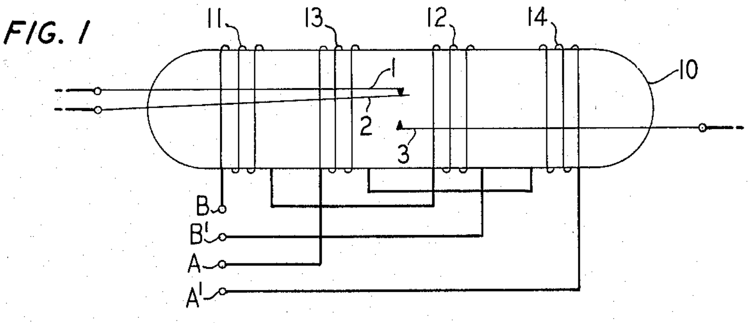

FIG. 2

| | APPLICATION OF CURRENT TO WINDING | COLUMN 1 FIELD IMPRESSED DUE TO WINDING CURRENT | COLUMN 2 FIELD ESTABLISHED AFTER CESSATION OF PULSE | COLUMN 3 CONTACT CONFIG. BEFORE PULSE | COLUMN 4 CONTACT CONFIG. AFTER PULSE |
|---|---|---|---|---|---|
| ROW 1 | BB' | 1 → 2 → → 3 | 1 → 2 → → 3 | 1 & 2 CLOSED 2 & 3 OPEN | 1 & 2 OPEN 2 & 3 CLOSED |
| ROW 2 | AA' | 1 → 2 → ← 3 | 1 → 2 ← ← 3 | 1 & 2 OPEN 2 & 3 CLOSED | 1 & 2 CLOSED 2 & 3 OPEN |

FIG. 3

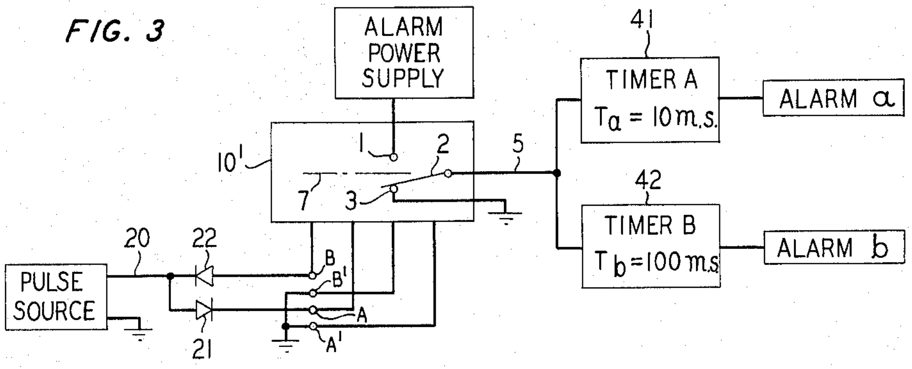

FIG. 3A

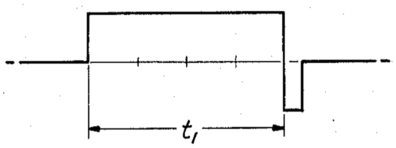

FIG. 4

| PULSE TIME $t_1$ in m.s. | ALARM |
|---|---|
| $0 < t_1 < 10$ | NONE |
| $10 \leq t_1 < 100$ | a |
| $100 \leq t_1$ | a AND b |

INVENTOR
H. N. WAGAR
BY
SE Hollander
ATTORNEY

United States Patent Office 3,254,172

Patented May 31, 1966

3,254,172
ELECTRICAL SWITCHING DEVICE

Harold N. Wagar, Madison, N.J., assignor to Bell Telephone Laboratories, Incorporated, New York, N.Y., a corporation of New York Filed Jan. 9, 1964, Ser. No. 336,676
11 Claims. (Cl. 200—87)

This invention relates to an electrically controlled transfer device for pulse conversion and more particularly to a transfer device employing remanent magnetic material.

With the higher speeds of operation that have become increasingly prevalent in the present day electrical circuits and systems, new and more efficient circuit components have been concurrently developed to keep pace with this ever expanding need. With the advent of such new components, transitional elements have been developed for situations in which a certain degree of compatibility between the older and slower systems and the newer more rapid systems is required.

An example of the need for compatibility exists between modern communication systems and techniques and the older established telephone communication arrangements. One such attempt has been the development of the ferreed element disclosed in Patent 2,995,637 of A. Feiner et al., issued August 8, 1961. The ferreed is a sealed reed metallic contact switch which is operable in response to high speed electronic control or input signals effective to control the magnetization of remanent magnetic material in the structure. The ferreed may advantageously be utilized as a crosspoint device such as that shown in T. N. Lowry Patent 3,073,085, issued May 28, 1962.

While the various ferreed structures and arrangements so far disclosed are fully operative and satisfactory for the purposes to which they have been applied, these switches have usually been constructed of two reeds and, therefore, inherently incapable of singly performing transfer circuit functions.

Certain prior art devices include polarized transfer contact relays which do not utilize the ferreed type action present in the instant invention. In certain transfer devices, the minimum response time is approximately 1000 times the duration of pulses which control vacuum tubes and solid state devices in electronic systems. Moreover, the versatility of such devices is usually limited to switching by a positive mechanical transfer of the armature in response to applied pulses of sufficient sustained duration.

Accordingly, it is an object of my present invention to provide an improved electrically controlled mechanical transfer switching device.

It is a further object of my invention to provide compatibility between standard circuit arrangements requiring mechanical transfer switches with metallic contacts and input control signals at electronic speeds.

Another object of my invention is to provide an electrical transfer switching arrangement which, in response to input pulses of duration approximating or exceeding the inherent mechanical switching time, performs one part of the switching sequence at the initiation of the input pulse and delays the remaining portion of the switching sequence until after the cessation of the input pulse.

Still another object of my invention is to provide an arrangement for translating the time duration of an input control pulse into a corresponding discrete output signal.

It is, therefore, obvious that a desirable type of transfer switch would be one which employs ferreed type action to enable the mechanical actuation of metallic contacts after the cessation of pulses of electronic speeds. Moreover, in response to pulses of longer duration than the mechanical transfer time of the switch, it would be advantageous if such a device could be made to either complete the switching function before the end of an applied input control pulse or to begin to switch at the initiation of the input pulse and to delay the completion of its switching until the end of this pulse. Such a switch would be extremely versatile in that it would have both the desirable ferreed characteristics embodied in a transfer switch and also the capability of being selectively controlled by pulses of longer duration.

Thus, in one specific illustrative embodiment of the principles of this invention a transfer switch using remanent magnetic material is used as a pulse converter. The switching element herein disclosed comprises a sealed reed switch which contains a remanent magnetic member and a soft magnetic member contiguously disposed with respect to each other and both attached at one end of the envelope. A third member composed of remanent magnetic material is disposed substantially parallel to the first two members mentioned but from the opposite end of the envelope in a manner such that the ends of all three members are situated to allow contact to be made by the middle soft magnetic member to either outside remanent member. Windings are disposed about the envelope so that each half of the enclosed arrangement of magnetic members can either be magnetized with a series aiding or with a series opposing flux.

When input pulses of very short duration, as compared with the mechanical transfer time of the armature, or soft magnetic member, are applied to the windings about the envelope to establish series aiding magnetic fluxes, the armature will move from one outside contact to the other independent of the pulse duration, and even more, the armature will move even after the pulse has passed. While the same switching action takes place if short input pulses are used to establish series opposing fluxes, when these input pulses establishing series opposing fluxes are of duration comparable to or greater than the mechanical switching time of a mechanically unbiased switch, the armature will move off the contact against which it had been resting after the beginning of the input pulse and remain midway between the two outside contact members without making contact until after the cessation of the input pulse. Thereupon the armature will move against the outside contact toward which it had started its journey. If a long pulse is applied to the input windings to create series aiding fluxes, switching action takes place as though the pulse was of short duration.

It is, therefore, possible to employ this device as an interface element between a source of elctronic input signuals and old art switching arrangements by using its inherent characteristics of ferreed action in response to pulses of short duration. It is also possible to use this device in quite a different fashion such as in pulse conversion to utilize its response to long input pulses which establish opposing fluxes. An illustrative example employing the advantageous characteristics of my invention would be its utilization as a device for detecting pulses of very short duration (or electronic speeds), intermediate duration or long duration and giving an appropriate alarm indication in response thereto.

Accordingly, it is a feature of my invention that an electrically responsive transfer switch is controlled by remanently magnetic members which are electrically isolated from the input control.

Another feature of my invention includes facilities for controlling the transfer switching action by control pulses of shorter duration than the mechanical response time of the switch.

Still another feature of my invention includes means for causing the armature contact to be moved from its initial position against a first contact to a neutral stable position for the duration of an input control pulse of duration longer than or comparable to the mechanical response time and to complete a connection to a second contact only after the cessation of the control pulse.

A further feature of my invention includes means for translating the duration of successive input pulses into corresponding alarm indications.

These and other objects and features of my invention will become apparent when taken in conjunction with the specification, the appended claims and the attached drawing in which:

FIG. 1 is a physical representation of a switching element embodying the principles of this invention;

FIG. 2 is a table showing the directions of fields established in specific portions of the switching element of FIG. 1 and the corresponding contact configurations;

FIG. 3 shows an embodiment whereby the switching element of FIG. 1 is used to translate the length of a pulse into a corresponding alarm signal;

FIG. 3A is an illustration of an output signal produced by the pulse source; and FIG. 4 is a table showing the correspondence between the duration of the input pulse and the alarm indicators activated.

I. SWITCH CONSTRUCTION

Referring initially to FIG. 1, the basic elements of the transfer switch are represented therein. A sealed envelope 10 encloses a mechanically unbiased swinger or armature 2 composed of "soft" magnetic material, or material exhibiting low coercivity. Two remanently magnetic members 1 and 3, composed of material having a substantially square hysteresis loop and appreciable coercivity well known in the art, are disposed from opposite ends of the envelope and arranged in a position so that swinger 2 can make contact with either, as determined by the electromagnetic field configurations to be discussed infra. Also provided are a set winding AA' which includes coils 13 and 14 oppositely wound in a fashion so that a current applied thereto will establish opposing fluxes in each half of the envelope (i.e., a flux in a first direction in members 1 and 2 and a flux in a second direction in member 3) and a reset winding BB' which includes coils 11 and 12 wound about the envelope in a fashion so as to establish series aiding fluxes in each half of the envelope (i.e., fluxes in members 1, 2, and 3 which are in the same direction). Those skilled in the art will recognize numerous equivalent winding arrangements to establish either series aiding or series opposing fluxes within the envelope which are within the purview of this arrangement.

II. ENERGIZATION OF SWITCH

A. *General description*

If reference is made to the table illustrated in FIG. 2, the operation of the switch in response to axial magnetic fields established within the envelope by the windings may be more clearly seen. The direction of the magnetic field due to current flow in any coil may be determined by using the familiar right-hand rule. The arrows shown in the table of FIG. 2 are conventionally used to represent the orientation of a magnetic field. By convention, the head of the arrow denotes a north pole and the tail of the arrow denotes a south pole when the arrow is used to represent flux or magnetic fields within a magnetic member. Column 1 depicts diagrammatically the direction of the field impressed as a result of current flowing in appropriate windings and column 2 shows the direction of magnetic field established in the reeds after the cessation of the input current pulse. In both columns 1 and 2 the arrow shown dotted is used to represent the field within the armature or soft magnetic member 2 which is influenced by either the impressed field or by the remanent field existing by virtue of members 1 and 3. The third column describes the condition of the contacts of the members 1, 2, and 3 before the input pulse is applied and column 4 depicts the contact configuration after the pulse has disappeared. The numerical designations alongside the arrows in columns 1 and 2 refer to the magnetic members in which the flux is established.

Thus, in the first row designated by the current applied to winding BB' (current emerges from terminal B and enters at B'), the field pattern as shown in column 1 is established within the magnetic members as a result of the pulse energization of reset winding BB'. It is to be noted that the flux within members 1 and 2 is established by the current in coil 11 and the two must therefore be similarly oriented. In addition, since coil 12 is wound in the same direction as coil 11, the flux produced by a current therein orients the flux in member 3 to the same direction as that in members 1 and 2. Column 3 indicates the position of the contacts before this magnetization is applied. Armature 2 rests upon member 1 so that the contacts of members 1 and 2 are closed and the contacts of members 2 and 3 are open (designated as the set condition). After the cessation of the input current pulse, column 4 shows that the armature 2 moves to member 3 so that the contacts of members 1 and 2 are now open and the contacts of members 2 and 3 are now closed. The armature is forced to change from the set to the reset position because of the axial magnetic fields established by the input current pulse flowing in winding BB'. The impressed magnetic field establishes stable states of remanent magnetization within members 1 and 3 to coincide with the direction of the impressed fields. Because of the remanent magnetic characteristics of members 1 and 3, they remain polarized with magnetic flux in the directions established even after the removal of the impressed field established by the current pulse.

B. *Application of short series aiding input pulses*

The situation depicted in row 1 shows diagrammatically that while the impressed field is sustained, members 1 and 2 contain fluxes which are similarly oriented with the arrowhead at the free end of both designating north magnetic poles which create forces of repulsion thereat to tend to cause the contacts of members 1 and 2 to separate. The flux contained within member 2 after the cessation of the impressed field is a result of the remanent flux emanating from members 1 and 3. The field pattern thus established causes flux within the envelope to flow out of members 1 and 2 and into member 3 to return members 1 and 2 outside the envelope. Column 2 shows that the flux in member 2 remains oriented in the same direction as during the condition existing in column 1 and therefore the previously existing north magnetic pole is maintained at the free end of member 2. The north pole of member 2 is repelled from the north pole at the free end of member 1 and attracted to the south pole at the free end of member 3. Armature 2, therefore, moves against member 3 to arrive at the condition depicted in column 4 wherein the contacts of members 1 and 2 open and contacts of members 2 and 3 are closed.

It is to be noted that after the cessation of the input current in winding BB' the magnetic field established by virtue of the remanent flux emanating from members 1 and 3 tends to orient itself in paths of least reluctance. It may therefore be expedient to adjust the relative cross sectional areas of members 1 and 3 or provide the free ends thereof with pole faces of judiciously selected areas to further aid the establishment of the flux pattern described above and thus overcome any unwanted marginal conditions that might exist.

C. *Application of short series opposing input pulses*

Row 2 depicts the condition when a current pulse is applied to winding AA' (current emerges from terminal A and enters at A') to thereby establish series opposing magnetic fields within each half of the envelope. Before the imposition of these magnetic fields, the switch had been in a reset condition so that, as indicated in column 3, contacts 1 and 2 are open and contacts 2 and 3 are closed. As before, column 1 shows the orientation of the magnetic fields within the magnetic members 1, 2, and 3 during the time winding AA′ is energized and column 2 shows the condition of the magnetic field within the switch members after the energizing pulse has been removed. The orientation of the remanent magnetic fields in members 1 and 3 is set by the axial magnetic field established by the winding currents. After the impressed magnetic field is removed by the cessation of the input current, the flux in member 2 (which had been in the same direction as in member 1 by virtue of the current in coil 13) is reversed by the tendency of the magnetic field to arrange itself in a configuration of least reluctance. This causes the flux leaving the free end of member 1 (as depicted by the arrowhead) to enter the free end of member 2 (as depicted by the tail of the dotted arrow) and the emergence of the flux of member 2 to return to member 1 at the attached ends of the members. In addition, member 2 forms a part of the path of least reluctance for the remanent flux of member 3 which path is completed outside the envelope. The contributions of flux from members 1 and 3 that are carried within member 2 are in the same direction and, therefore, it may be seen that a south pole is created at the free end in member 2. The remaining portion of the magnetic flux pattern established causes a north pole at the free end of member 1 to be attracted to the south pole of member 2 to cause the closure of members 1 and 2 and the opening of members 2 and 3. It should be noted that members 2 and 3 had forces of repulsion impressed for the brief time during the establishment of the input pulse, for as shown in column 1, the free ends of members 2 and 3 were both made magnetic north poles for the duration of the pulse.

If now the condition in row 1 is re-established by the imposition of a current pulse to winding BB′ to cause series aiding pulses to be established in the switch, the swinger will move back to the initial position wherein it rests against member 1.

D. *Application of long input pulses*

The switch is also capable of delayed switching in response to long input pulses. If an input pulse of duration comparable to or longer than the mechanical transfer time of the swinger is impressed upon winding AA′ so as to cause a series opposing flux to be established as shown in row 2, column 1, similar polarity magnetic poles are established at the free ends of all three members during the duration of the pulse. In the situation supposed, north poles are established in each of the free ends of members 1, 2, and 3 so that if initially the switch was in the condition wherein member 2 rested against member 3, the creation and sustenance of the north poles described would force member 2 away from member 3 immediately after the initiation of the current pulse and at the same time prevent member 2 from making contact with member 1 until after the termination of the pulse. The reason for this is because the north poles at the free ends of all three members establish forces of repulsion of equal magnitude between members 1 and 2 and 2 and 3, respectively, which persist until the cessation of the input current and the consequent realignment of the magnetic field pattern as depicted in column 2, row 2. Therefore, after the cessation of the pulse, the situation as previously depicted in row 2 is exactly as described above.

If a pulse of long duration is impressed so as to cause series aiding fluxes to be established in the magnetic members of the switch, this delayed action switching will not take place. No delay as previously described is possible since the switch in the set condition with members 1 and 2 making contact responds to the application of the magnetic field configuration (established by virtue of current in winding BB′) shown in column 1, row 1, to create both forces of repulsion between members 1 and 2 and forces of attraction between members 2 and 3. Whether the pulse is of long or short duration the magnetic field orientation within all three members remains the same during and after the pulse as shown in row 1, column 2. Therefore, it is to be noted that delayed switching takes place only when the switch is initially in the reset condition with swinger member 2 making contact with member 3 and a series opposing flux is impressed.

III. EMPLOYMENT AS A PULSE CONVERTER

FIG. 3 discloses a means for advantageously utilizing features of this switch for converting an input pulse of arbitrary length into a corresponding output signal or alarm. It should be obvious at the outset that the arrangement is only one illustrative application of my invention and that numerous other arrangements can be found by those skilled in the art without departing from the principles herein disclosed.

A pulse source 19, which might serve to represent the output of a telephone switching office relay which is energized during the performance of its function, is applied to the input of the pulse converter via conductor 20. The output wave form shown in FIG. 3A, to consist of a positive pulse for duration $t_1$ followed by a negative impulse of current which might be the result of an inductive surge, is applied to the input windings of switch 10′ through oppositely poled diodes 21 and 22. The positive portion of the wave form of FIG. 3A is applied to winding AA′ to cause series opposing magnetic fluxes to be established within the magnetic members as described previously. This causes member 2 to separate from member 3 immediately after the initiation of the pulse and remain in the equilibrium position midway between members 1 and 3, as denoted by center line 7 for the duration of the pulse as represented by time $t_1$, whereupon the swinger member 2 moves toward and makes contact with member 3. Swinger 2 remains at the center line 7 for the duration of the pulse.

At the conclusion of the pulse the negative going current appearing after a time $t_1$, as shown in FIG. 3A, is applied by means of diode 22 to winding BB′ to briefly establish series aiding fluxes in the switch members. Since the switch is capable of responding mechanically after the cessation of short input pulses, swinger 2 moves away from member 1 to make contact with member 3 and thus return to its initial position ready to respond to the next input pulse.

FIG. 4 is a table showing the correspondence between the duration of the input pulse and the alarm indicators activated. Timers A and B begin their respective timing cycles when ground is removed from conductor 5 by the opening of the contacts of members 2 and 3 in response to the initiation of the positive current pulse of FIG. 3A. Each timer may be designed so that the removal of ground from its input for a period equal to or longer than the duration of its timing period, will cause the subsequent application of input alarm power as a result of contact between members 1 and 2 to energize the associated alarm. However, if ground is removed for a time which is less than the timing cycle period, the subsequent application of alarm power will interrupt the timing cycle and cause the timer to prevent the associated alarm from being energized.

Thus, for example, timers A and B of FIG. 3 have timing cycles of 10 and 100 milliseconds, respectively and the mechanical transfer time of the switch is 3 milliseconds. If as shown in FIG. 4 the duration $t_1$ of pulse source 19 is illustratively 8 milliseconds (any number less than 10 milliseconds) ground is interrupted from timers A and B for a time less than their respective timing periods and the subsequent application of alarm power to conductor 5 after the 8-second interval interrupts the timing of both timers A and B and no alarm is allowed to be energized. However, if the duration $t_1$ is illus- 100), timer A will allow alarm A to be energized at the end of $t_1$ since its timing cycle has been completed but timer B will be interrupted after 18 milliseconds to tratively 18 milliseconds (any number between 10 and prevent the energization of alarm *b*. Finally, if $t_1$ is greater than 100 milliseconds, timers A and B both will have completed their cycles when alarm power is applied and therefore alarms *a* and *b* will both be energized. At the end of time $t_1$ the negative pulse (which might be 1 microsecond long) restores member 2 to its initial position against member 3 within the 3-millisecond transfer time.

It should be noted that numerous timers exist which may be adapted for this application by those skilled in the art. Furthermore, the alarms can be audible, visible, electrical or any other type or combination thereof and still be consistent with the principles herein discussed. Moreover, it is to be understood that the above-described arrangements are illustrative of the application of the principles of the invention. Numerous other arrangements may be devised by those skilled in the art without departing from the spirit and scope of the invention.

What is claimed is:

1. An electrical switching device comprising a pair of remanent magnetic members exhibiting two stable magnetic states, a nonremanent magnetic member interposed in operative relationship between said pair of members, and input pulse responsive means effective in response to an input pulse for setting said remanent members to similar stable states to effect contact after the termination of said pulse between said nonremanent member and a first of said pair of members and for setting said remanent members to opposite stable states to effect contact after the termination of said pulse between said nonremanent member and a second of said pair of members.

2. A relay switch comprising an envelope, a first means including a pair of remanent reeds supported from opposite ends of said envelope having contiguously disposed contact portions and exhibiting two stable states of remanent magnetization, a second means including a magnetic nonremanent reed supported from one of said ends of said envelope having a contact portion in juxtaposition with said contact portions of said remanent magnetic members, and input pulse responsive means effective in response to an input pulse for setting said remanent reeds to similar polarities to effect a contact after the termination of said pulse between said contact portions of two of said reeds and for setting said remanent reeds to opposite polarities to effect a contact after the termination of said pulse between said contact portions of a different two of said reeds.

3. An electrical switching device comprising a pair of remanent magnetic members exhibiting two stable states of remanent magnetization having juxtaposed contact portions, a nonremanent magnetic member disposed between said pair of remanent members for transferring contact from a first of said pair to a second of said pair of remanent members within a specified time duration, and input pulse responsive means effective in response to an input pulse of equal or greater duration than said specified time duration to set said remanent members to similar stable states to cause said remanent member to contact a first of said pair of remanent members during the sustenance of said input pulse and to set said remanent members to opposite stable states to effect the opening of said contacting members during the sustenance of said input pulse and to cause said nonremanent member to contact a second of said pair of remanent members after the termination of said pulse.

4. An electrical transfer switch comprising an envelope, a first means including a pair of remanent reeds supported from opposite ends of said envelope having contiguously disposed contact portions and exhibiting two stable states of remanent magnetization, a second means including a magnetic nonremanent reed supported from one of said ends of said envelope having a contact portion in juxtaposition with said contact portions of said remanent members, and input pulse responsive means effective in response to an input pulse for setting said remanent reeds to similar polarities to effect a contact between said contact portions of two of said members during the sustenance of said input pulse and for setting said remanent reeds to opposite polarities to effect the opening of said first pair of contact portions during the sustenance of said input pulse and to delay coupling between said contact portion of a different two of said reeds until after the termination of said pulse.

5. A relay transfer switch comprising an envelope, a first means including a pair of remanent reeds supported in substantially parallel relationship from opposite ends of said envelope having contiguously disposed contact portions and comprising material exhibiting two stable states of remanent magnetization, a second means including a magnetic nonremanent swinger reed supported from one of said ends of said envelope between said remanent pair having a contact portion contiguous to said contact portions of each of said remanent reeds and having a specified mechanical transfer time, winding means disposed about said reeds and responsive to input pulses of shorter duration than said mechanical transfer time for setting said remanent reeds to similar polarities to effect contact after the termination of said pulse between said contact portions of said swinger and a first of said remanent reeds and for setting said remanent contact portions to opposite polarities to effect contact after the termination of said pulse between said contact portions of said swinger and a second of said remanent reeds, said winding means further responsive to input pulses of equal or greater duration than said transfer time for setting said remanent contact portions to similar polarities to effect a contact between said contact portions of said swinger and said first remanent reed during the sustenance of said input pulse and for setting said remanent contact portions to opposite polarities to cause said swinger reed to move away from said first remanent reed during the sustenance of said long input pulse and to delay the contact between said contact portions of said swinger and said second remanent reeds until after the termination of said long input pulse.

6. A tristable mechanical switching device comprising a pair of magnetic members exhibiting two stable polarities of remanent magnetization and having contiguously disposed contact portions, a nonremanent magnetic member having contact portions juxtaposed with said contact portions of said pair of magnetic members, and input pulse responsive means effective in response to an input pulse for setting said remanent members to similar stable polarities to establish a first stable state during or after the termination of said pulse and for setting said remanent members to opposite stable polarities to establish a third stable state during the sustenance of said pulse and to establish said second stable state after the termination of said pulse.

7. A tristable mechanical switching device in accordance with claim 6 wherein said first mechanical state comprises a contact between said contact portions of a first two of said members, said second mechanical state comprises a contact between said contact portions of a different two of said members and said third mechanical state comprises no contact between said members.

8. A tristable mechanical switching device in accordance with claim 7 further comprising an envelope wherein said remanent members include reeds supported from opposite ends of said envelope and wherein said nonremanent member is supported from one of said ends of said envelope and disposed between said remanent pair.

9. An electrical switching device comprising a pair of remanent magnetic members exhibiting a plurality of stable magnetic states, a nonremanent magnetic member, one of said members being a transfer member disposed in operative relationship with the remaining two of said members, and input pulse responsive means effective in response to an input pulse for setting said remanent members to a first combination of said stable magnetic states to effect the mating between said transfer member and a first of said remaining members and for setting said remanent members to a second combination of said stable magnetic states to effect the mating between said transfer member and a second of said remaining members after the termination of said pulse.

10. An electrical switching device comprising a pair of remanent magnetic members exhibiting a plurality of stable magnetic states, a nonremanent magnetic member, said three members being arranged so that one is a transfer member interposed in operative relationship between the remaining two with said transfer member requiring a defined time interval to move from one of said remaining members to the other, and input pulse responsive means effective in response to an input pulse of equal or greater duration than said defined time interval to set said remanent members to a first combination of said stable states to effect a contact between said transfer member and a first of said remaining members during the sustenance of said input pulse and to set said remanent members to a second combination of said stable magnetic states to effect a break in said contact between said transfer member and said first remaining member during the sustenance of said input pulse and to effect a contact between said transfer member and the second of said remaining members after the termination of said pulse.

11. An electrical transfer switching device comprising a pair of remanent magnetic members exhibiting a plurality of stable magnetic states, a nonremanent magnetic member, said three members being arranged so that one is a transfer member interposed in operative relationship between the remaining two with said transfer member requiring a defined time duration to move from one of said remaining members to the other, and winding means encompassing said members responsive to input pulses of shorter duration than said specified time duration to set said remanent members in a first manner to a first combination of said stable magnetic states to effect a coupling after termination of said pulse between said transfer member and a first of said remaining members and to set said remanent members in a second manner to a second combination of stable magnetic states to effect a coupling after the termination of said pulse between said transfer member and a second of said remaining members, said winding means further responsive to input pulses of equal or greater duration than said specified time duration to set said remanent members in said first manner to couple said transfer member and said first of said remaining members during the sustenance of said input pulse and to set said remanent members in said second manner to effect and maintain the opening of said transfer member and said first remaining member during the sustenance of said input pulse and to couple said transfer member and said second of said remaining members after the termination of said pulse.

References Cited by the Examiner

UNITED STATES PATENTS

| | | | |
|---|---|---|---|
| 2,669,706 | 2/1954 | Gray | 340—164 |
| 2,929,895 | 3/1960 | Shebanow | 200—87 |
| 2,989,730 | 6/1961 | Brosh | 340—164 |
| 3,059,075 | 10/1962 | Peek | 200—87 |

BERNARD A. GILHEANY, *Primary Examiner.*

JOSEPH J. BAKER, *Assistant Examiner.*